United States Patent
Nakashima et al.

(10) Patent No.: US 7,246,600 B2
(45) Date of Patent: Jul. 24, 2007

(54) CONTROL DEVICE FOR INTERNAL COMBUSTION ENGINE

(75) Inventors: Tatsushi Nakashima, Anjo (JP); Motoki Ohtani, Toyota (JP)

(73) Assignees: Nippon Soken, Inc., Nishio-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/236,766

(22) Filed: Sep. 28, 2005

(65) Prior Publication Data

US 2006/0137648 A1 Jun. 29, 2006

(30) Foreign Application Priority Data

Dec. 27, 2004 (JP) ............... 2004-377397

(51) Int. Cl.
*F02M 7/00* (2006.01)
*H01H 47/00* (2006.01)

(52) U.S. Cl. .................... 123/435; 361/152

(58) Field of Classification Search ........... 123/434, 123/435, 673, 679, 695, 478, 480, 491; 361/152, 361/154, 155
See application file for complete search history.

(56) References Cited

U.S. PATENT DOCUMENTS

| 4,465,046 | A |   | 8/1984  | May              |         |
|-----------|---|---|---------|------------------|---------|
| 5,157,613 | A | * | 10/1992 | Williams et al.  | 701/111 |
| 5,163,405 | A |   | 11/1992 | Ahern et al.     |         |
| 5,327,864 | A | * | 7/1994  | Regueiro         | 123/260 |
| 6,032,650 | A |   | 3/2000  | Rask             |         |
| 6,411,886 | B1 |  | 6/2002  | Morra et al.     |         |
| 6,659,073 | B1 |  | 12/2003 | Franke et al.    |         |
| 6,971,360 | B2 | * | 12/2005 | Katayama         | 123/192.1 |
| 7,134,420 | B2 | * | 11/2006 | Miyashita        | 123/299 |
| 2004/0099237 | A1 | * | 5/2004 | Katayama         | 123/192.1 |
| 2006/0096575 | A1 | * | 5/2006 | Araki et al.     | 123/406.47 |

FOREIGN PATENT DOCUMENTS

| DE | 103 13 859 A1 | 12/2003 |
|----|---------------|---------|
| JP | A4-187851     | 7/1992  |
| JP | A 6-101554    | 4/1994  |
| JP | A 6-299942    | 10/1994 |
| JP | A 7-158500    | 6/1995  |
| JP | 09-112325     | 4/1997  |
| JP | A 9-126028    | 5/1997  |
| JP | A 11-173180   | 6/1999  |
| JP | A 11-182288   | 7/1999  |

(Continued)

OTHER PUBLICATIONS

G. Topfer, et al.; "Optical Investigation of Knocking Location on S. I. Engines with Direct- Injection"; The Engineering Society For Advancing Mobility Land Sea Air and Space International; SAE 2000 World Congress Detroit, Michigan; XP-002358182; pp. 1-13; Mar. 6-9, 2000.

*Primary Examiner*—John T. Kwon
(74) *Attorney, Agent, or Firm*—Oliff & Berridge, PLC

(57) ABSTRACT

An ECU executes a program including the steps of: calculating a base timing of injection (INJB); determining whether an engine knocks; if the engine knocks, increasing a correction value INJK(I) applied to correct a timing of injection; and calculating the base timing of injection INJB plus the correction value INJK(I) to obtain a timing of injection INJ.

20 Claims, 7 Drawing Sheets

FOREIGN PATENT DOCUMENTS

| | | |
|---|---|---|
| JP | A 2001-248482 | 9/2001 |
| JP | A 2002-54486 | 2/2002 |
| JP | A 2002-339848 | 11/2002 |
| JP | A 2004-3429 | 1/2004 |
| JP | A 2004-156562 | 6/2004 |
| LU | 90 727 A1 | 8/2002 |

\* cited by examiner

CONTROL DEVICE FOR INTERNAL COMBUSTION ENGINE

This nonprovisional application is based on Japanese Patent Application No. 2004-377397 filed with the Japan Patent Office on Dec. 27, 2004, the entire contents of which are hereby incorporated by reference.

BACKGROUND OF THE INVENTION

1. Field of the Invention

The present invention relates generally to control devices for internal combustion engines and particularly to control devices for internal combustion engines having a cylinder receiving fuel directly injected thereinto.

2. Description of the Background Art

Conventionally a direct injection engine directly injecting fuel into a cylinder is commercially available. The direct injection engine includes an engine allowing fuel to be injected at an intake stroke to combust a homogeneous air fuel mixture to provide homogeneous combustion, and an engine allowing fuel to be injected at a compression stroke to combust an air fuel mixture with an air fuel ratio increased around an ignition plug to provide stratified combustion. Furthermore, there also exists a direct injection engine dividing fuel injection in two, i.e., injecting the fuel at intake and compression strokes. Such a direct injection engine can also knock, and such knocking needs to be minimized.

Japanese Patent Laying-Open No. 2004-003429 discloses a controller that can reduce knocking caused in a stratified combustion mode of operation, without inviting misfire, poor exhaust emission and the like. As described in the publication, in the stratified combustion mode of operation when a knock detector detects that engine knocks the controller controls a knock prevention controller for the stratified combustion mode to introduce spark retard for correction as well as fuel injection retard for correction and switches the stratified combustion mode to a homogeneous combustion mode. In reducing the knocking, as controlled, when an amount or result of correcting at least one of spark retard and fuel injection retard exceeds a prescribed threshold value, the stratified combustion mode is switched to a double injection stratified combustion mode. When the detector detects that the engine operating in the double injection stratified combustion mode knocks, a knock prevention controller associated with the mode corrects at least one of a ratio between fuel injected at the intake stroke and that injected at the compression stroke, the timing of fuel injection at the intake stroke, and the timing of spark. It should be noted that the timing of fuel injection at the compression stroke is not corrected. Furthermore in the double injection stratified combustion mode if the engine knocks and the knocking is reduced as controlled, and as a result at least one of an amount or result of correcting the fuel distribution ratio, the timing of fuel injection at the intake stroke, and the timing of spark exceeds a prescribed threshold value, then the double injection stratified combustion mode is switched to a homogeneous combustion mode.

As disclosed in the publication, the knock reduction controller can introduce a spark retard in the stratified combustion mode of operation for correction to prevent knocking, while introducing a fuel injection retard for correction corresponding to the amount of the spark retard for correction so that in the stratified combustion mode of operation, fuel injection and spark can be timed to have a relationship allowing a spark to be provided when injected fuel flows in a vicinity of a spark plug. Thus in the stratified combustion mode of operation a spark retard for correction can be introduced to prevent an engine from knocking while misfire, poor exhaust emission, and the like can be prevented by introducing a fuel injection retard for correction.

Furthermore, in general, the double injection stratified combustion mode allows spark and fuel injection to be timed for correction over a wider range than the stratified combustion mode. Thus in the former mode knocking can be more readily reduced than in the latter mode. As such, in the stratified combustion mode of operation when an amount or result of correction introduced to prevent the engine from knocking exceeds a prescribed threshold value (e.g., the amount or result is limited by a correction guard value), then a decision is made that the knocking cannot completely be prevented in the stratified combustion mode, and the stratified combustion mode is switched to the double injection stratified combustion mode. Such knocking that cannot completely be prevented in the stratified combustion mode, can thus be handled.

Furthermore, in the double injection stratified combustion mode, in addition to a timing of spark a fuel distribution ratio (an amount of fuel injected at the intake stroke) and a timing of injection of fuel at the intake stroke can also be corrected to prevent an engine from knocking. Note that if the fuel distribution ratio (the amount of fuel injected at the intake stroke) is corrected, the amount can be reduced to a level disallowing self-ignition to prevent the engine from knocking, or, in contrast, the amount can be increased and heat generated as injected fuel vaporizes at the intake stroke can be utilized to reduce the temperature of a gas present in the cylinder to prevent the engine from knocking.

Furthermore the homogeneous combustion mode allows spark and fuel injection to be timed for correction over a further wider range than the stratified combustion mode and the double injection stratified combustion mode. Thus in the former mode knocking can be further more readily reduced than in the latter modes. As such, in the stratified combustion mode of operation if the detector detects that the engine knocks or in the double injection stratified combustion mode of operation if the engine knocks and the knocking is reduced as controlled, and as a result at least one of an amount or result of correcting the fuel distribution ratio, the timing of fuel injection at the intake stroke, and the timing of spark exceeds a prescribed threshold value, then the mode is switched to the homogeneous combustion mode. Such knocking that cannot completely be prevented in the double injection stratified combustion mode or (the stratified combustion mode), can thus be handled.

As disclosed in Japanese Patent Laying-Open No. 2004-003429, the knocking prevention controller corrects a timing of fuel injection as it exerts control to prevent knocking. It should be noted, however, that an in-cylinder air fuel mixture has a distribution (in concentration) that can vary with the timing of fuel injection. The air fuel mixture having a varied distribution results in a varied timing (or speed) of propagation of flame in the cylinder. The timing of propagation of flame in the cylinder that varies with location can cause the engine to knock. The publication, however, neither discloses nor suggests such a disadvantage in connection with the knock prevention controller disclosed therein. Thus there still exists the problem of the uncorrected timing of propagation of flame in a cylinder.

SUMMARY OF THE INVENTION

An object of the present invention is to provide an appropriate timing of propagation of a flame in a cylinder to prevent an engine from knocking.

Another object of the present invention is to reduce smoke, insufficient vaporization of fuel, and insufficient mixture of fuel and air.

The present invention in one aspect provides a control device for an internal combustion engine including an injector injecting fuel directly into a cylinder. The control device includes: a detector detecting that an engine knocks; and a controller controlling the injector to provide a faster timing of propagation of flame in the cylinder toward an intake side when that the engine knocks is detected.

In a direct injection engine injecting fuel into a cylinder from an intake side the timing of propagation of flame toward the intake side is slower than the timing of propagation of flame toward the exhaust side because of the different flame propagation distances caused by spark plug offset mount, and the combustion chamber wall temperature distribution. As such, the intake side's air fuel mixture is adiabatically compressed. As a result, the engine tends to knock. The present invention prevents the engine from knocking at the intake side by advancing the timing of propagation of flame in the cylinder toward the intake side when that the engine knocks is detected. The cylinder can thus have a flame propagated therein timely to prevent the intake side from having an air fuel mixture adiabatically compressed resulting in the engine knocking.

Preferably the controller controls the injector to increase an air fuel ratio in the cylinder at the intake side to provide a faster timing of propagation of flame in the cylinder toward the intake side.

In accordance with the present invention, for conditions such as full load, an air fuel ratio controlled to be richer than a theoretical air fuel ratio, and other similar conditions for which knocking is a problem, an air fuel ratio richer (or lower) than the cylinder's internal, overall air fuel ratio tends to result in a slower timing of propagation of flame. The present invention can render the intake side's air fuel ratio lean (or high), i.e., control it to be close to the theoretical air fuel ratio to provide an advanced timing of propagation of flame toward the intake side.

Still preferably the controller introduces a fuel injection advance at an intake stroke.

In accordance with the present invention when a fuel injection advance is introduced at an intake stroke, in the cylinder the piston's top portion is impinged on by fuel so that a large portion of the fuel is carried through the cylinder toward the exhaust side. Thus the intake side's air fuel mixture can be controlled to be lean, i.e., close to the theoretical air fuel ratio.

Still preferably the control device further includes a limiter limiting a timing of injection of fuel to be no earlier than a first predetermined timing of injection and no later than a second predetermined timing of injection.

The present invention can prevent fuel injection advanced and retarded more than required. This can prevent the piston's top portion from having fuel adhering thereon more than required resulting in smoking, the fuel insufficiently evaporating, and the fuel and air being mixed insufficiently.

Still preferably the control device further includes a spark retarder introducing a spark retard when that the engine knocks is detected and the timing of injection is the first timing.

In accordance with the present invention if fuel is injected as timed as controlled and the engine still knocks, a spark retard can be introduced to prevent the engine from knocking.

Still preferably the cylinder receives fuel divided and thus injected twice at intake and compression strokes and the controller introduces a fuel injection retard at the compression stroke.

In accordance with the present invention when a fuel injection retard is introduced at a compression stroke, in the cylinder the piston's top portion is impinged on by fuel so that a large portion of the fuel is carried through the cylinder toward the exhaust side. Thus the intake side's air fuel mixture can be controlled to be lean, i.e., close to the theoretical air fuel ratio.

Still preferably the control device further includes a limiter limiting a timing of injection of fuel to be no earlier than a first predetermined timing of injection and no later than a second predetermined timing of injection.

The present invention can prevent fuel injection advanced and retarded more than required. This can prevent the piston's top portion from having fuel adhering thereon more than required resulting in smoking, the fuel insufficiently evaporating, and the fuel and air being mixed insufficiently.

Still preferably the control device further includes a spark retarder introducing a spark retard when that the engine knocks is detected and the timing of injection is the second timing.

In accordance with the present invention if fuel is injected as timed as controlled and the engine still knocks, a spark retard can be introduced to prevent the engine from knocking.

Still preferably the controller introduces the fuel injection retard at the compression stroke and in addition thereto increases an amount of fuel injected at the compression stroke.

In accordance with the present invention when fuel is injected at a compression stroke in an increased amount the fuel impinges in the cylinder on the piston's top portion so that an increased amount of the fuel is carried in the cylinder toward the exhaust side. Thus the intake side's air fuel ratio can be controlled to be lean or close to a theoretical air fuel ratio.

Still preferably the control device further includes a limiter limiting the amount to be at least a first predetermined amount and at most a second predetermined amount.

The present invention can prevent fuel from being injected in an amount more and less than required. An appropriate air fuel ratio can be obtained.

Still preferably the control device further includes a spark retarder introducing a spark retard when that the engine knocks is detected and the amount is the second amount.

In accordance with the present invention if fuel is injected in an amount as controlled and the engine still knocks then a spark retard can be introduced to prevent the engine from knocking.

The present invention in another aspect provides a control device for an internal combustion engine including an injector injecting fuel directly into a cylinder. The control device includes: a detector detecting a timing of propagation of flame in the cylinder; and a controller controlling the injector to advance a timing of propagation of flame in the cylinder toward an intake side when the timing of propagation of flame in the cylinder toward the intake side is slower than that of propagation of flame in the cylinder toward an exhaust side.

In a direction injection engine injecting a fuel into a cylinder from an intake side the timing of propagation of flame toward the intake side is slower. If the timing of propagation of flame toward the intake side is slower than that of propagation of flame toward the exhaust side, the intake side's air fuel mixture is adiabatically compressed, and the engine can knock. To prevent this, the present invention provides a faster timing of propagation of the flame in the cylinder toward the intake side. Thus the flame can be propagated in the cylinder timely. This can prevent the intake side from having an air fuel mixture adiabatically compressed resulting in the engine knocking. Thus the cylinder can have a flame therein propagated timely to prevent the engine from knocking.

Preferably the controller controls the injector to increase an air fuel ratio in the cylinder at the intake side to provide a faster timing of propagation of flame in the cylinder toward the intake side.

In accordance with the present invention, for conditions such as full load, an air fuel ratio controlled to be richer than a theoretical air fuel ratio, and other similar conditions for which knocking is a problem, an air fuel ratio richer (or lower) than the cylinder's internal, overall air fuel ratio tends to result in a slower timing of propagation of flame. The present invention can render the intake side's air fuel ratio lean (or high), i.e., control it to be close to the theoretical air fuel ratio to provide an advanced timing of propagation of flame toward the intake side.

Still preferably the controller introduces a fuel injection advance at an intake stroke.

In accordance with the present invention when a fuel injection advance is introduced at an intake stroke, in the cylinder the piston's top portion is impinged on by fuel so that a large portion of the fuel is carried through the cylinder toward the exhaust side. Thus the intake side's air fuel mixture can be controlled to be lean, i.e., close to the theoretical air fuel ratio.

Still preferably the control device further includes a limiter limiting a timing of injection of fuel to be no earlier than a first predetermined timing of injection and no later than a second predetermined timing of injection.

The present invention can prevent fuel injection advanced and retarded more than required. This can prevent the piston's top portion from having fuel adhering thereon more than required resulting in smoking, the fuel insufficiently evaporating, and the fuel and air being-mixed-insufficiently.

Still preferably the control device further includes a spark retarder introducing a spark retard when that the engine knocks is detected and the timing of injection is the first timing.

In accordance with the present invention if fuel is injected as timed as controlled and the engine still knocks, a spark retard can be introduced to prevent the engine from knocking.

Still preferably the cylinder receives fuel divided and thus injected twice at intake and compression strokes and the controller introduces a fuel injection retard at the compression stroke.

In accordance with the present invention when a fuel injection retard is introduced at a compression stroke, in the cylinder the piston's top portion is impinged on by fuel so that a large portion of the fuel is carried through the cylinder toward the exhaust side. Thus the intake side's air fuel mixture can be controlled to be lean, i.e., close to the theoretical air fuel ratio.

Still preferably the control device further includes a limiter limiting a timing of injection of fuel to be no earlier than a first predetermined timing of injection and no later than a second predetermined timing of injection.

The present invention can prevent fuel injection advanced and retarded more than required. This can prevent the piston's top portion from having fuel adhering thereon more than required resulting in smoking, the fuel insufficiently evaporating, and the fuel and air being mixed insufficiently.

Still preferably the control device further includes a spark retarder introducing a spark retard when that the engine knocks is detected and the timing of injection is the second timing.

In accordance with the present invention if fuel is injected as timed as controlled and the engine still knocks, a spark retard can be introduced to prevent the engine from knocking.

Still preferably the controller introduces the fuel injection retard at the compression stroke and in addition thereto increases an amount of fuel injected at the compression stroke.

In accordance with the present invention when fuel is injected at a compression stroke in an increased amount the fuel impinges in the cylinder on the piston's top portion so that an increased amount of the fuel is carried in the cylinder toward the exhaust side. Thus the intake side's air fuel ratio can be controlled to be lean or close to a theoretical air fuel ratio.

Still preferably the control device further includes a limiter limiting the amount to be at least a first predetermined amount and at most a second predetermined amount.

The present invention can prevent fuel from being injected in an amount more and less than required. An appropriate air fuel ratio can be obtained.

Still preferably the control device further includes a spark retarder introducing a spark retard when that the engine knocks is detected and the amount is the second amount.

In accordance with the present invention if fuel is injected in an amount as controlled and the engine still knocks then a spark retard can be introduced to prevent the engine from knocking.

Still preferably, more than one detector is provided in the cylinder.

In accordance with the present invention a timing of propagation of flame can be detected in the cylinder at a plurality of locations with high precision.

Still preferably the detector is disposed in the cylinder at two locations closer to the intake and exhaust sides, respectively.

A timing of propagation of flame toward the intake side and that of propagation of flame toward the exhaust side can be detected.

Still preferably the detector is an ion current detection device.

Internal to a flame an air fuel mixture has its molecules ionized. As such, the flame is electrically conductive. In accordance with the present invention an ion current detection device can be provided to detect whether a current flows to detect a timing of propagation of flame.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter with reference to the drawings the present invention in embodiments will be described. In the following description, identical components are identically denoted and also identical in name and function.

First Embodiment

Figure 1:
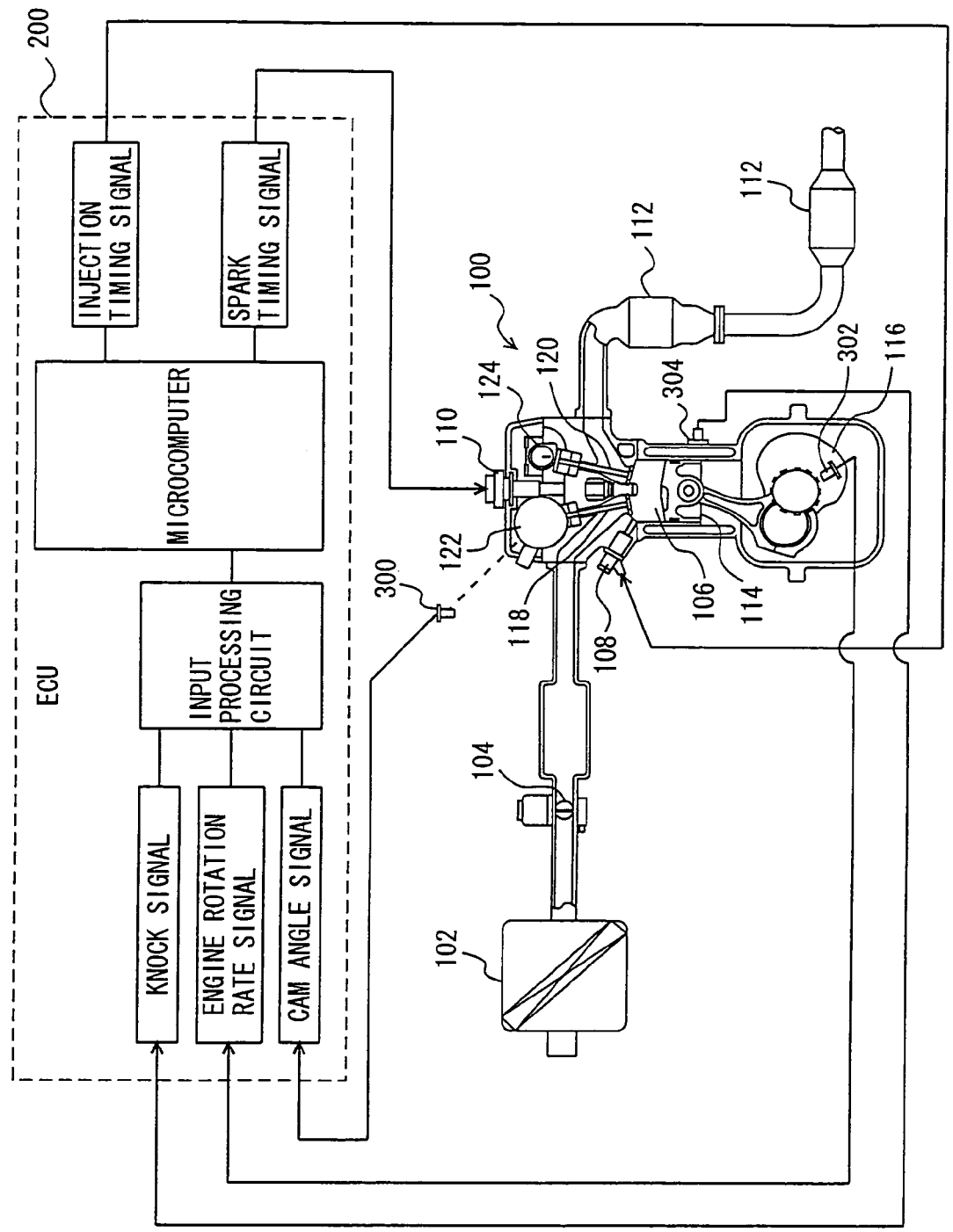
FIG. 1 schematically shows a configuration of an engine of a vehicle mounting the present control device in a first embodiment.

With reference to FIG. 1 will be described an engine of a vehicle mounting the present control device in a first embodiment. In the present embodiment the control device is implemented for example by a program executed by an electronic control unit (ECU) 200 shown in FIG. 1.

Engine 100 intakes air from an air cleaner 102 in an amount as adjusted by a throttle valve 104 which is a motor driven, electric machinery controlled-throttle valve.

The air is introduced into a cylinder 106 (a combustion chamber) and mixed with fuel therein. Cylinder 106 receives fuel directly injected thereinto from an injector 108. More specifically, injector 108 has an injection nozzle hole located in cylinder 106. The fuel is injected from that side of cylinder 106 which intakes (or introduces) air.

The fuel is injected at an intake stroke, although the timing of injection of the fuel is not limited to the intake stroke. Furthermore, while in the present embodiment engine 100 is described as a direct injection engine with injector 108 having its injection nozzle hole located in cylinder 106, in addition to injector 108 for direct injection an injector for port injection may also be introduced.

The air fuel mixture in cylinder 106 is ignited by a spark plug 110 and thus combusts. The combusted air fuel mixture, or exhaust gas, is purified by a ternary catalyst 112 and then exhausted external to the vehicle. As the air fuel mixture combusts, a piston 114 is pushed downward and a crankshaft 116 rotates.

Cylinder 106 has a top portion provided with an intake valve 118 and an exhaust valve 120. Cylinder 106 introduces air in an amount and as timed, as controlled by intake valve 118, and exhausts gas in an amount and as timed, as controlled by exhaust valve 120. Intake valve 118 is driven by a cam 122 and exhaust valve 120 is driven by a cam 124.

ECU 200 controls a timing of ignition, a timing of fuel injection, an amount of fuel injected, a timing of opening and closing the intake and exhaust valves, and the like to operate engine 100, as desired. ECU 200 receives a signal representative of the cam's position from a cam angle sensor 300, a signal representative of a rate of rotation of crank shaft 116 (or the engine) and an angle of rotation of crank shaft 116 from a crank angle sensor 302, and a signal representative of vibration in intensity of engine 100 from a knock sensor 304.

ECU 200 employs the signals received from the sensors and a map and a program stored in a memory (not shown) to control engine 100. In the present embodiment ECU 200 receives a signal transmitted from knock sensor 304 and therefrom detects whether the engine knocks, and if ECU 200 detects that the engine knocks ECU 200 corrects a timing of injection of the fuel.

Figure 2:
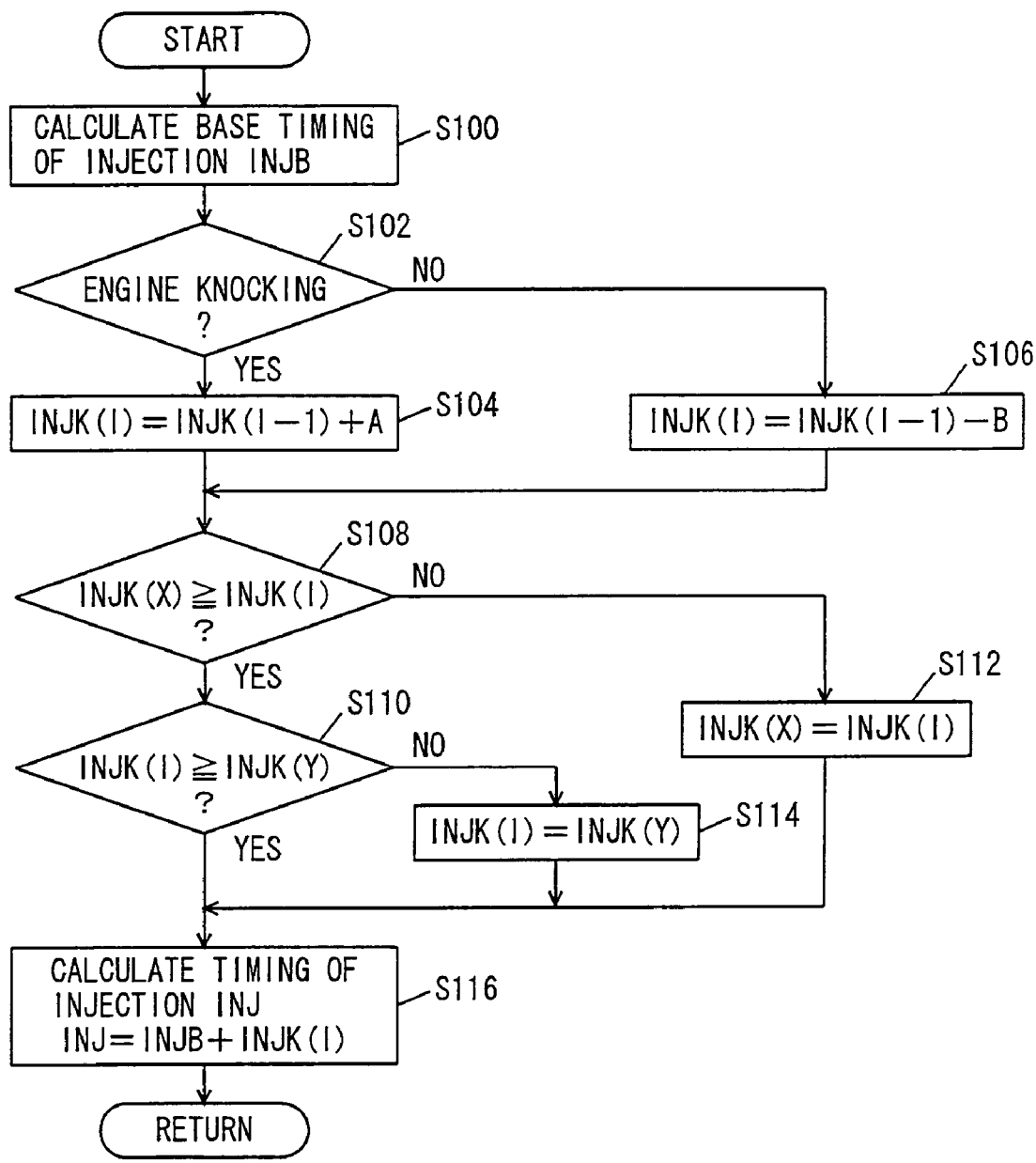
FIG. 2 is a flow chart of a program for control executed by an ECU implementing the present control device of the first embodiment.

With reference to FIG. 2, ECU 200 implementing the control device in the present embodiment executes a program for control structured as described hereinafter.

At step (S) 100, ECU 200 calculates a timing of base injection of the fuel INJB as based on a map with the engine's rate of rotation, load (torque) and the like serving as parameters. Timing INJB is calculated so that the fuel is injected at an intake stroke (e.g., before top dead center (BTDC): 90° to 180°). Furthermore, timing INJB is calculated to be larger for faster timing of injection. How timing INJB is calculated will not specifically be described herein as it can be calculated by well-known, general technique.

At S102 ECU 200 determines from a signal transmitted from knock sensor 304 whether the engine knocks. Whether the engine knocks or not can be determined by well-known, general technique. When the engine knocks (YES at S102), the process proceeds with S104. Otherwise (NO at S102), the process proceeds with S106.

At S104 ECU 200 calculates a correction value applied to correct the timing of injection INJK(I)=INJK(I−1)+A, wherein INJK(I−1) represents a previously calculated, value for correction and A represents a positive constant. More specifically, at S104 correction value INJK(I) is increased and an injection advance is introduced.

At S106 ECU 200 calculates correction value INJK(I) =INJK(I−1)−B, wherein B represents a positive constant. More specifically, at S104 correction value INJK(I) is decreased and an injection retard is introduced. The process then proceeds with S108.

At S108 ECU 200 determines whether correction value INJK(I) is no more than a predetermined upper limit value INJK(X) set to have a value so that smoke generated by fuel adhering to the top portion of piston 114 has an amount falling within a tolerable range. Correction value INJK(I) is no more than upper limit value INJK(X) (YES at S108) the process proceeds with S110. Otherwise (NO at S108) the process proceeds with S112.

At S110 ECU 200 determines whether correction value INJK(I) is no less than a predetermined lower limit value INJK(Y) set to have a value allowing the fuel to appropriately evaporate and the fuel and air to be mixed together appropriately. If correction value INJK(I) is no more than lower limit value INJK(Y) (YES at S110) then the process proceeds with S116. Otherwise (NO at S110) the process proceeds with S114.

At S112 ECU 200 sets upper limit value INJK(X) at correction value INJK(I). Subsequently the process proceeds with S116. At S114 ECU 200 sets lower limit value INJK(Y) at correction value INJK(I). Subsequently the process proceeds with S116.

At S116 ECU 200 calculates the timing of base injection INJB plus correction value INJK(I) to obtain a timing of injection INJ. At this timing of injection INJ injector 108 injects the fuel.

In accordance with the configuration and flowchart as described above ECU 200 implementing the control device in the present embodiment operates, as will be described hereinafter.

While engine 100 operates, the base timing of injection INJB is calculated (S100) and from a signal transmitted from knock sensor 304 whether the engine knocks or not is determined (S102).

Figure 3:
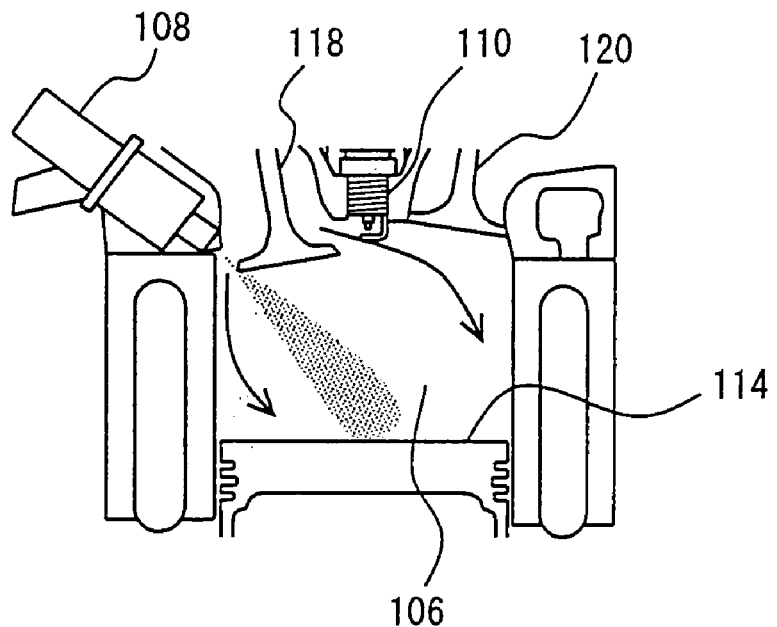
FIG. 3 is a first view showing fuel injected at an intake stroke.
Figure 4:
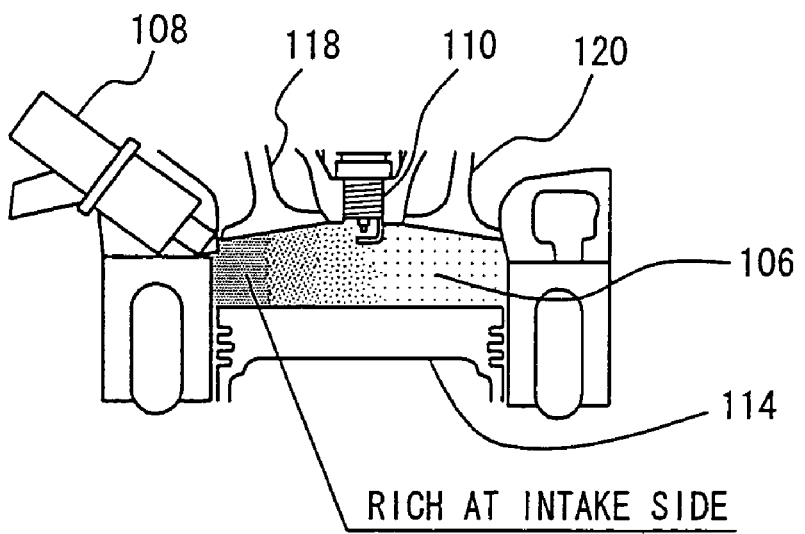
FIG. 4 is a first view showing an air fuel mixture's condition at ignition.

As shown in FIG. 3, if a timing of injection is set to be retarded (or closer to the bottom dead center), the fuel, sprayed and thus provided with force to penetrate, proceeds through cylinder 106 downward. In that case, as seen in FIG. 3, a clockwise stream (tumble) acts to push, and when a spark is made, cylinder 106 internally has an air fuel ratio relatively rich at a location closer to the intake side and relatively lean at a location closer to the exhaust side, as shown in FIG. 4.

After the spark is made, the timing of propagation of a flame is significantly affected by the air fuel ratio (or an air fuel mixture's concentration), the temperature of a wall of cylinder 106, and the like. In general, the timing of propagation of flame is fastest for theoretical air fuel ratio. Accordingly, an air fuel ratio richer or leaner than the theoretical air fuel ratio contributes to a faster timing of propagation of flame. Furthermore, the wall with lower temperature tends to contribute to slower timing of propagation of flame. Thus the timing of propagation of flame toward the intake side having an air fuel ratio richer than the theoretical air fuel ratio and closer to a wall lower in temperature, tends to be retarded. In that case, the air fuel mixture closer to the intake side is adiabatically compressed, and the engine tends to knock at the intake side.

When the engine knocks (YES at S102) a correction value INJK(I) is calculated as INJK(I)=INJK(I−1)+A to provide an increased amount for correction (S104). If the calculated correction value INJK(I) is no more than upper limit INJK(X) (YES at S108) and also no less than lower limit value INJK(Y) (YES at S110) then the base timing of injection INJB plus correction value INJK(I) is calculated to obtain a timing of injection INJ (S116). Thus, the timing of injection INJ is advanced.

Figure 5:
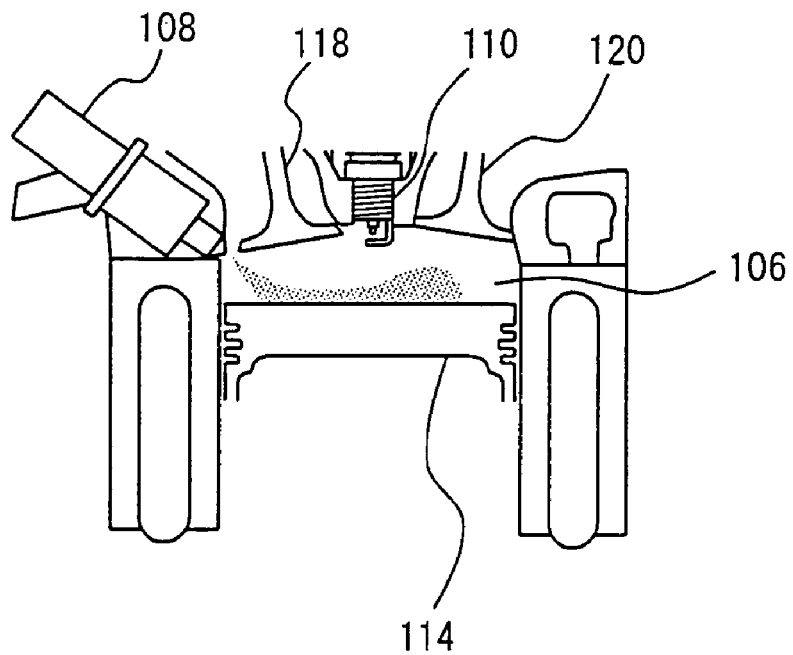
FIG. 5 is a second view showing fuel injected at an intake stroke.
Figure 6:
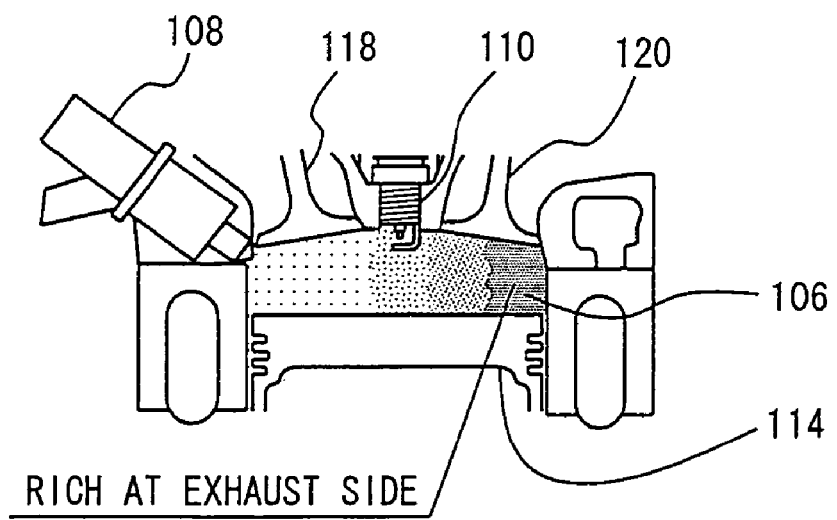
FIG. 6 is a second view showing an air fuel mixture's condition at ignition.

When the timing of injection INJ is advanced or an injection advance is introduced, the fuel injected from injector 108 impinges on the top portion of piston 114, as shown in FIG. 5. Thus a large portion of the injected fuel is carried to the exhaust side. Thus, as shown in FIG. 6, when a spark is made the exhaust side has a relatively rich air fuel ratio and the intake side has a relatively lean air fuel ratio. In other words, the intake side has an air fuel ratio relatively lean to be close to the theoretical air fuel ratio. This can provide a faster timing of propagation of flame toward the intake side to prevent the engine from knocking at the intake side.

If an injection advance more than required is introduced, however, the fuel adhering to the top portion of piston 114 may generate an increased amount of smoke. Accordingly, an upper limit is set for correction value INJK(I).

More specifically, if a calculated correction value INJK(I) is no less than upper limit value INJK(X) (NO at S108), upper limit value INJK(X) is set as correction value INJK(I). More specifically, correction value INJK(I) finally calculated is limited to be smaller than upper limit value INJK(X). This can reduce smoke exceeding a tolerable range.

If the engine does not knock (NO at S102), injection retard is introduced. More specifically, correction value INJK(I) is calculated as INJK(I−1)−B and thus reduced (S106).

If the calculated correction value INJK(I) is no more than upper limit INJK(X) (YES at S108) and also no less than lower limit value INJK(Y) (YES at S110), the base timing of injection INJB plus correction value INJK(I) is calculated to obtain a timing of injection INJ (S116). Thus, timing of injection INJ is retarded.

If injection retard more than required is introduced, however, insufficient vaporization of the fuel, insufficient mixture of the fuel and air, and the like may be invited. Accordingly, a lower limit is set for correction value INJK (I).

More specifically, if a calculated correction value INJK(I) is no more than lower limit value INJK(Y) (NO at S110), lower limit value INJK(Y) is set as correction value INJK(I). More specifically, correction value INJK(I) finally calculated is limited to be at least lower limit value INJK(Y). This can reduce insufficient vaporization of the fuel, insufficient mixture of the fuel and air, and the like.

Thus when the ECU implementing the control device in accordance with the present embodiment detects that an engine knocks, the ECU introduces a fuel injection advance at an intake stroke to advance a timing of injection (or set the timing of injection closer to the top dead center). Thus in the cylinder the intake side has an air fuel ratio relatively lean to be close to a theoretical air fuel ratio to provide a faster timing of propagation of flame toward the intake side. This can contribute to reduced adiabatical compression of the air fuel mixture at the intake side and hence reduced knocking.

Second Embodiment

Figure 7:
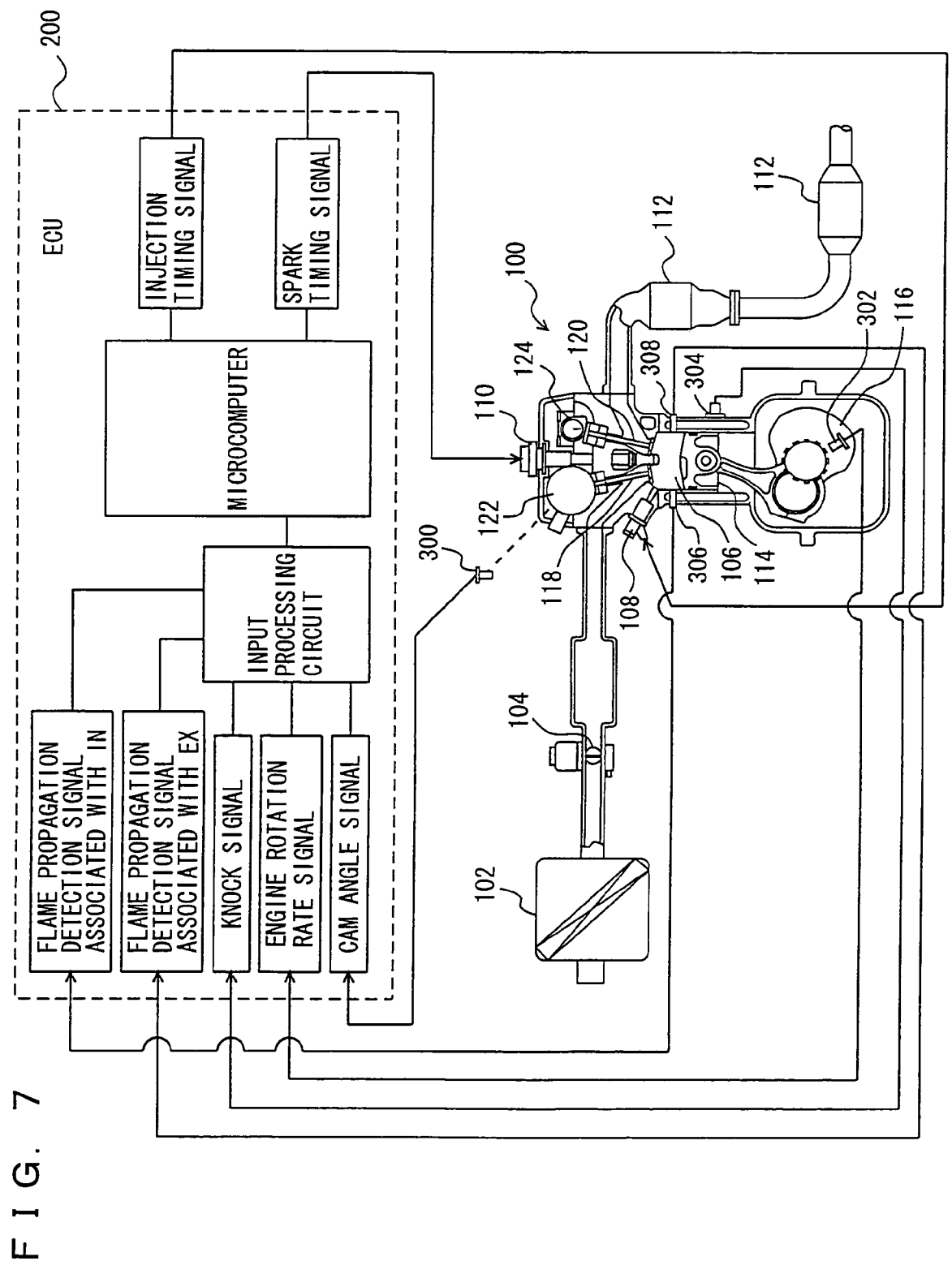
FIG. 7 schematically shows a configuration of an engine of a vehicle mounting the present control device in a second embodiment.
Figure 8:
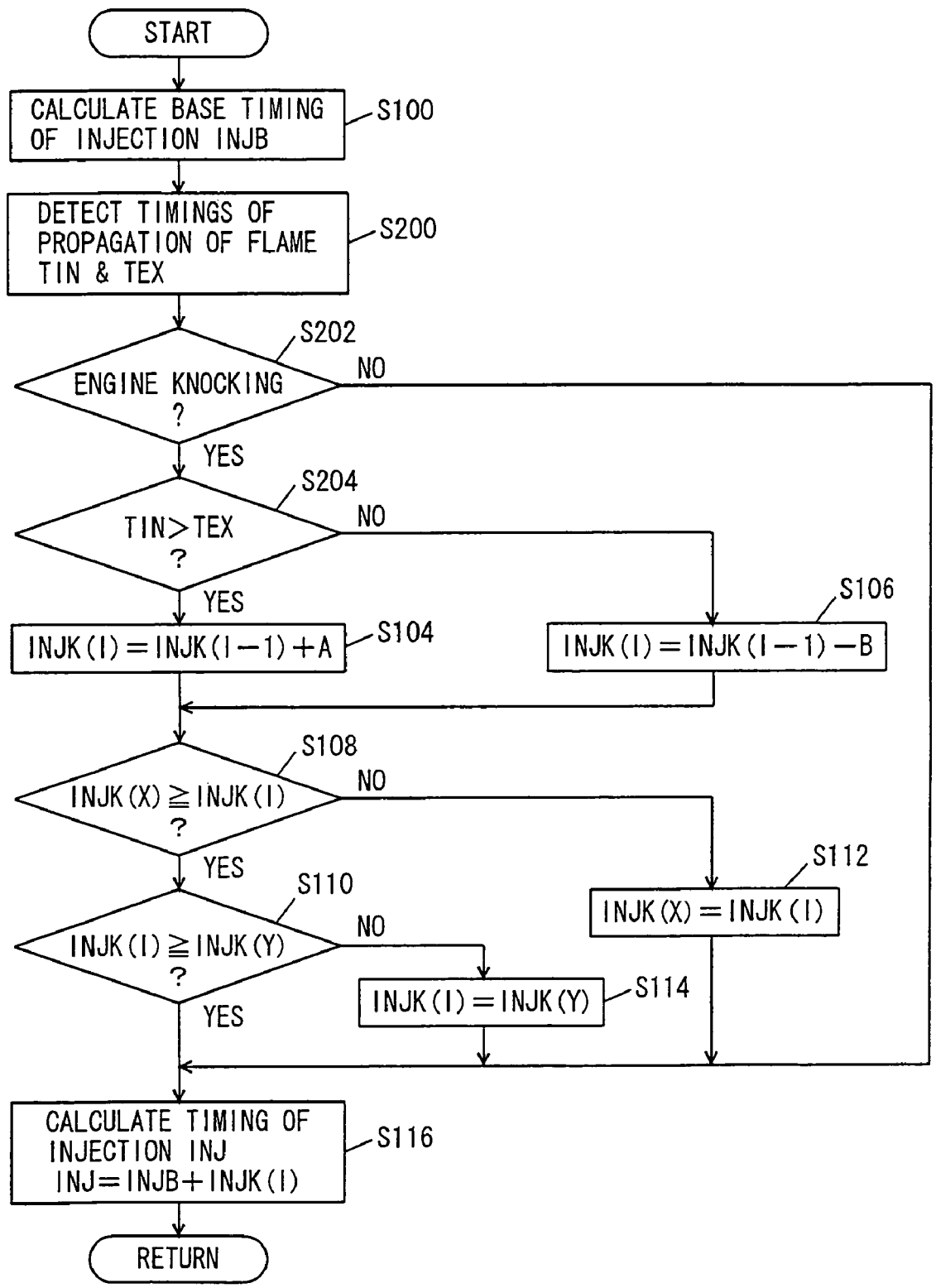
FIG. 8 is a flow chart of a program for control executed by an ECU implementing the present control device of the second embodiment.

With reference to FIGS. 7 and 8 the present invention in a second embodiment will be described. In the first embodiment when that an engine knocks is detected a fuel injection advance is introduced at an intake stroke to reduce knocking. In the present embodiment when that an engine knocks is detected and in a cylinder a timing of propagation of flame toward an intake side is slower than that of propagation of flame toward an exhaust side a fuel injection advance is introduced at an intake stroke.

A timing of propagation of flame in the cylinder is detected by an ion current detection device provided at the cylinder. The remainder is identical in arrangement to that described in the first embodiment and also identical in function.

With reference to FIG. 7, an engine of a vehicle having mounted therein the present control device in accordance with the present embodiment, will be described. As shown in the figure, cylinder 106 has intake and exhaust sides with their respective wall surfaces provided with ion current detection devices 306 and 308, respectively, although the devices are not limited in location to such two locations.

In the flame, the air fuel mixture has molecules ionized. As such, the flame is electrically conductive. As such, when voltage is applied to electrode of ion current detection devices 306, 308 inserted into the air fuel mixture, a current flows.

In the present embodiment ion current detection device 306, 308 detects a current flowing through electrode and a signal representing a resultant detection is input to ECU 200. ECU 200 detects a timing of flowing the current as that of propagation of the flame.

With reference to FIG. 8, ECU 200 implementing the control device in accordance with the present invention executes a program for control structured as will now be described hereinafter. Note that any step identical to that of the program described in the first embodiment is identically labeled.

At S200 ECU 200 detects from a signal received from ion current detection devices 306 and 308 a timing of propagation of flame in cylinder 106 toward the intake side TIN and a timing of propagation of flame in the cylinder toward the exhaust side TEX.

At S202 ECU 200 detects from a signal received from knock sensor 304 whether engine knocks. If so (YES at S202) the process proceeds with S204. Otherwise (NO at S202) the process proceeds with S116.

At S204 ECU 200 determines whether timing TIN is slower than timing TEX. If so (YES at S204), the process proceeds with S104. Otherwise (NO at S204) the process proceeds with S106.

In accordance with the configuration and flow chart as described above, ECU 200 implementing the control device in accordance with the present invention operates as described hereinafter.

While engine 100 operates, a base timing of injection INJB is calculated (S100) and from signals received from ion current detection devices 306 and 308 timing TIN and timing TEX are detected (S200). Furthermore from a signal received from knock sensor 304 whether the engine knocks or not is determined (S202).

If the engine knocks (YES at S202) and timing TIN is slower than timing TEX (YES at 204), a different timing of propagation of flame is considered to cause the engine to knock.

Accordingly, correction value INJK(I) is calculated as INJK(I−1)+A to provide an increased amount for correction (S104) and finally, timing of injection INJ is advanced. A faster timing of propagation of flame toward the intake side can be achieved and the engine's knocking at the intake side can be reduced.

If the engine knocks (YES at S202) and timing TIN is faster than timing TEX (NO at S204), then a factor other than timing of propagation of flame is considered to cause the engine to knock.

In that case, correction value INJK(I) is calculated as INJK(I−1)−B and thus reduced (S106) and finally, timing of injection INJ is retarded.

Thus an ECU implementing the control device in accordance with the present embodiment introduces injection advance to set a timing of injection to be faster (or closer to the top dead center) when an engine knocks and the timing of propagation of flame toward an intake side TIN is slower than that of propagation of flame toward an exhaust side TEX. This can also provide an effect similar to that achieved in the first embodiment.

Third Embodiment

Figure 9:
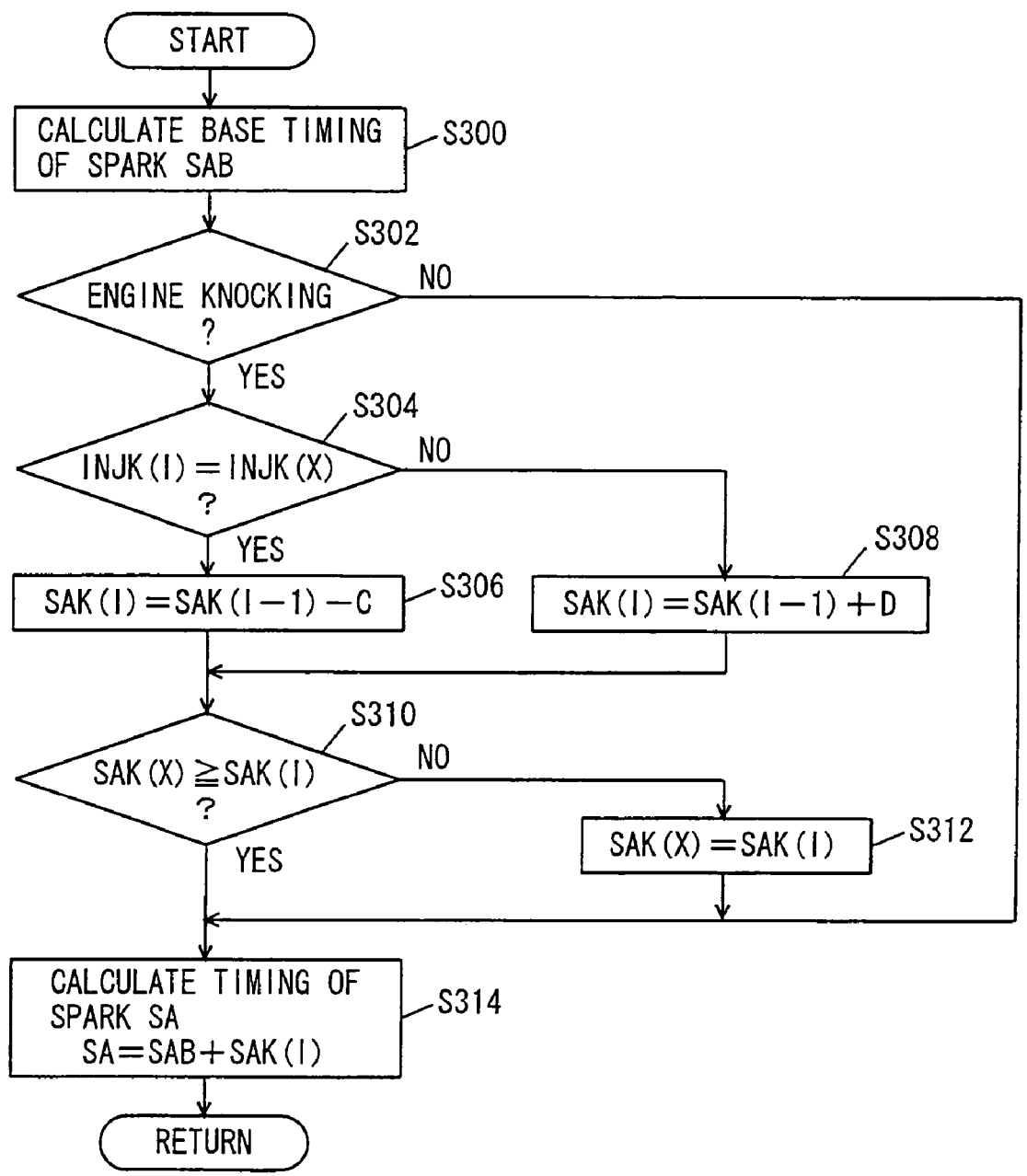
FIG. 9 is a flow chart of a program for control executed by an ECU implementing the present control device of the third embodiment.

With reference to FIG. 9 the present invention in a third embodiment will be described.

In the first and second embodiments a timing of injection of fuel at an intake stroke is corrected to reduce knocking. In the present embodiment a timing of injection and in addition thereto that of spark are corrected. The remainder is identical in arrangement to the first or second embodiment and also identical in function.

With reference to FIG. 9, ECU 200 implementing the control device in accordance with the present embodiment executes a program for control structured as described hereinafter. The ECU executes the program described in the first or second embodiment and in addition thereto a program as will be described hereinafter.

At S300 ECU 200 calculates a base timing of spark SAB as based on a map with the engine's rate of rotation, load (torque) and the like serving as parameters. Note that the base timing of spark SAB can be calculated by well-known, general techniques.

At S302 ECU 200 determines from a signal transmitted from knock sensor 304 whether the engine knocks. Whether the engine knocks or not can be determined by well-known, general technique. When the engine knocks (YES at S102), the process proceeds with S304. Otherwise (NO at S302), the process ends.

At S304 ECU 200 determines whether a correction value applied to correct a timing of injection INJK(I) is equal to upper limit value INJK(X). IF so, (YES at S304) the process proceeds with S306. Otherwise (NO at S304), the process proceeds with S308.

At S306 ECU 200 calculates a correction value applied to correct a timing of spark SAK(I) as SAK(I−1)−C, wherein SAK(I−1) represents a previously calculated correction value and C represents a positive constant. More specifically, at S306, correction value SAK(I) is reduced to introduce a spark retard.

At S308 ECU 200 calculates correction value SAK(I) as SAK(I−1)+D, wherein D represents a positive constant. More specifically at S308 correction value SAK(I) is increased to introduce a spark advance.

At S310 ECU 200 determines whether correction value SAK(I) is no more than a predetermined upper limit value SAK(X) set to have a value allowing engine 100 to provide an output (or torque) falling within a tolerable range. If correction value SAK(I) is no more than upper limit value SAK(X) (YES at 310), the process proceeds with S314. Otherwise (NO at S310) the process proceeds with S312.

At S312 ECU 200 sets upper limit value SAK(X) at correction value SAK(I). Subsequently the process proceeds with S314, at which step ECU 200 calculates the base timing of spark SAB plus correction value SAK(I) to provide a timing of spark SA, at which timing, cylinder 106 has its internal air fuel mixture ignited.

In accordance with the configuration and flow chart as described above ECU 200 implementing the control device in accordance with the present embodiment operates, as will be described hereinafter.

While engine 100 operates, the base timing of spark SAB is calculated (S300) and from a signal transmitted from knock sensor 304 whether the engine knocks or not is determined (S302).

If the engine knocks (YES at 302), then a decision is made as to whether correction value INJK(I) is equal to upper limit value INJK(X) (S304). Correction value INJK(I) equal to upper limit value INJK(X) (YES at S304) is considered to indicate that the timing of injection INJ can no further be advanced to prevent the engine from knocking.

Accordingly, correction value SAK(I) is calculated as SAK(I−1)−C and thus reduced (S306). In that case, correction value SAK(I) necessarily attains a value no more than upper limit value SAK(X) (YES at S310). Accordingly, the base timing of spark SAB plus the calculated correction value SAK(I) is calculated (S314) to retard the timing of spark SA.

In contrast, correction value INJK(I) different from upper limit value INJK(X) (YES at S304), i.e., correction value INJK(I) smaller than upper limit value INJK(X) is considered to indicate that the timing of injection INJ can be advanced to prevent the engine from knocking.

In that case, to introduce spark advance, correction value SAK(I) is calculated as SAK(I−1)+D and thus increased (S308). If the calculated correction value SAK(I) is no more than upper limit value SAK(X) (YES at S310), the base timing of spark SAB plus the calculated correction value SAK(I) is calculated to obtain a timing of spark SA (S314). In that case, a spark advance is introduced. This can prevent engine 100 from providing an output (or torque) reduced as spark retard is introduced.

If the timing of spark SA is advanced more than required, the air fuel mixture's combustion may be impaired resulting in engine 100 providing a reduced output (or torque). To prevent advance more than required, if correction value SAK(I) is greater than upper limit value SAK(X) (NO at S310), upper limit value SAK(X) is set to correction value SAK(I) (S312) and thus limited. This can prevent a timing of spark to be advanced more than required and hence engine 100 from providing a reduced output (or torque). Note that in addition to limiting correction value SAK(I) to be no more than upper limit value SAK(X), correction value SAK(I) may be limited to be no less than lower limit value SAK(Y).

Thus when ECU 200 implementing the control device in accordance with the present embodiment detects that an engine knocks, and correction value INJK(I) applied to correct a timing of injection is equal to upper limit value INJK(X), ECU 200 introduces spark retard. This can further prevent the engine from knocking when a timing of injection cannot be controlled to prevent the engine from knocking.

Other Embodiment

In the first and second embodiments, fuel injection advance is introduced at an intake stroke. Alternatively, fuel may be injected twice, i.e., at intake and compression strokes, and if the engine knocks, fuel injection retard may be introduced at the compression stroke, and if the engine does not knock, fuel injection advance may be introduced at the compression stroke. This can also provide an effect similar to that achieved in the first embodiment.

Furthermore, if fuel injection retard is introduced at the compression stroke, an upper limit (a limit associated with advance) and a lower limit (a limit associated with retard) of timing of injection may be provided. This can also provide an effect similar to that achieved in the first embodiment.

Furthermore, if such upper and lower limits are introduced for the timing of injection at the compression stroke, and the engine knocks and the timing of injection corresponds to the lower limit value, spark retard may be introduced to prevent the engine from knocking. This can also provide an effect similar to that achieved by the third embodiment.

Furthermore, if the engine knocks, then in addition to introduce fuel injection retard at the compression stroke the fuel may also be injected at the compression stroke in an increased amount (or in an amount increased in ratio), and if the engine does not knock, the fuel may be injected at the compression stroke in a reduced amount (or in an amount reduced in ratio). This can also provides an effect similar to that achieved by the first embodiment.

Furthermore, if the fuel is injected at the compression stroke in an increased amount, the amount may be provided with upper and lower limits. This can also provide an effect similar to that achieved by the first embodiment.

Furthermore, if such upper and lower limits are introduced for the amount of fuel injected at the compression stroke, and the engine knocks and the timing of injection corresponds to the upper limit value, spark retard may be introduced to prevent the engine from knocking. This can also provide an effect similar to that achieved by the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for an internal combustion engine including injection means injecting fuel directly into a cylinder, comprising:
   detection means for detecting that an engine knocks; and
   control means for controlling said injection means to provide a faster timing of propagation of flame in said cylinder toward an intake side when that the engine knocks is detected;
   wherein said control means includes means for controlling said injection means to increase an air fuel ratio in said cylinder at said intake side to provide a faster timing of propagation of flame in said cylinder toward said intake side.

2. The control device according to claim 1, wherein said control means includes means for introducing a fuel injection advance at an intake stroke.

3. The control device according to claim 2, further comprising means for limiting a timing of injection of fuel to be no earlier than a first predetermined timing of injection and no later than a second predetermined timing of injection.

4. The control device according to claim 3, further comprising means for introducing a spark retard when that said engine knocks is detected and said timing of injection is said first timing.

5. The control device according to claim 1, wherein:
   said cylinder receives fuel divided and thus injected twice at intake and compression strokes; and
   said control means includes means for introducing a fuel injection retard at said compression stroke.

6. The control device according to claim 5, further comprising means for limiting a timing of injection of fuel to be no earlier than a first predetermined timing of injection and no later than a second predetermined timing of injection.

7. The control device according to claim 6, further comprising means for introducing a spark retard when that said engine knocks is detected and said timing of injection is said second timing.

8. The control device according to claim 5, wherein said control means includes said means for introducing said fuel injection retard at said compression stroke and in addition thereto means for increasing an amount of fuel injected at said compression stroke.

9. The control device according to claim 8, further comprising means for limiting said amount to be at least a first predetermined amount and at most a second predetermined amount.

10. The control device according to claim 9, further comprising means for introducing a spark retard when that said engine knocks is detected and said amount is said second amount.

11. A control device for an internal combustion engine including an injector injecting fuel directly into a cylinder, comprising:
   a detector detecting that an engine knocks; and
   a controller controlling said injector to provide a faster timing of propagation of flame in said cylinder toward an intake side when that the engine knocks is detected;
wherein said controller controls said injector to increase an air fuel ratio in said cylinder at said intake side to provide a faster timing of propagation of flame in said cylinder toward said intake side.

12. The control device according to claim 11, wherein said controller introduces a fuel injection advance at an intake stroke.

13. The control device according to claim 12, further comprising an injection timing limiter limiting a timing of injection of fuel to be no earlier than a first predetermined timing of injection and no later than a second predetermined timing of injection.

14. The control device according to claim 13, further comprising a spark retarder introducing a spark retard when that said engine knocks is detected and said timing of injection is said first timing.

15. The control device according to claim 11, wherein:
   said cylinder receives fuel divided and thus injected twice at intake and compression strokes; and
   said controller introduces a fuel injection retard at said compression stroke.

16. The control device according to claim 15, further comprising an injection timing limiter limiting a timing of injection of fuel to be no earlier than a first predetermined timing of injection and no later than a second predetermined timing of injection.

17. The control device according to claim 16, further comprising a spark retarder introducing a spark retard when that said engine knocks is detected and said timing of injection is said second timing.

18. The control device according to claim 15, wherein said controller introduces said fuel injection retard at said compression stroke and in addition thereto increases an amount of fuel injected at said compression stroke.

19. The control device according to claim 18, further comprising a limiter limiting said amount to be at least a first predetermined amount and at most a second predetermined amount.

20. The control device according to claim 19, further comprising a spark retarder introducing a spark retard when that said engine knocks is detected and said amount is said second amount.

* * * * *